United States Patent [19]
Dauvergne et al.

[11] Patent Number: 5,938,266
[45] Date of Patent: Aug. 17, 1999

[54] DASHBOARD FOR A VEHICLE, SUCH AS, IN PARTICULAR, A MOTOR VEHICLE

[75] Inventors: Jean Dauvergne; Frédéric Bieri, both of Gondecourt, France

[73] Assignee: Reydel Societe Anonyme, Gondecourt, France

[21] Appl. No.: 08/838,644

[22] Filed: Apr. 7, 1997

[51] Int. Cl.⁶ .................................................. B62D 25/14
[52] U.S. Cl. ............................................. 296/70; 296/72
[58] Field of Search ........................................ 296/70, 72

[56] References Cited

U.S. PATENT DOCUMENTS

| | | | |
|---|---|---|---|
| 5,088,571 | 2/1992 | Burry et al. | 296/70 |
| 5,234,246 | 8/1993 | Henigue et al. | 296/70 |
| 5,387,023 | 2/1995 | Deneau | 296/72 |
| 5,549,344 | 8/1996 | Nishijima et al. | 296/70 |
| 5,556,153 | 9/1996 | Kelman et al. | 296/70 |
| 5,564,515 | 10/1996 | Schambre | 296/70 |
| 5,676,216 | 10/1997 | Palma et al. | 296/70 |
| 5,678,877 | 10/1997 | Nishijima et al. | 296/70 |

FOREIGN PATENT DOCUMENTS

| | | | |
|---|---|---|---|
| 456-531 | 11/1991 | European Pat. Off. | 296/70 |
| 3634-559 | 6/1987 | Germany | 296/70 |
| 2079694 | 1/1982 | United Kingdom | 296/70 |

*Primary Examiner*—Joseph D. Pape
*Assistant Examiner*—Kiran Patel
*Attorney, Agent, or Firm*—Harrison & Egbert

[57] ABSTRACT

A dashboard for a vehicle which is capable of permitting the integration of items, such as accessories and/or interior fittings of the vehicle. The dashboard is composed of a base framework which is predetermined to the type of the vehicle, an intermediate framework having a configuration that is semi-permanent as a function of the fittings of the vehicle and is secured to the base framework, and a variable trim capable of covering the base framework and the intermediate framework in such a way so as to assure the aesthetic finish of the dashboard. The base framework is secured to the body of the vehicle.

5 Claims, 4 Drawing Sheets

DASHBOARD FOR A VEHICLE, SUCH AS, IN PARTICULAR, A MOTOR VEHICLE

TECHNICAL FIELD

The present invention relates to a dashboard for a vehicle, such as, in particular, a motor vehicle.

Although more particularly developed for such applications, it can also be used in numerous other vehicles, seagoing craft, aircraft and/or land vehicles.

More generally speaking, it will be possible, moreover, to implement it as an internal arrangement grouping together various accessories or appliances and/or fittings or equipment, in all fields of industrial activity in which one encounters driving, control, supervisory or other positions or stations, whether it be in fixed or in mobile installations.

BACKGROUND ART

At the present time, dashboards are generally composed of a panel formed by an insert of moulded plastic or metallic material, or even of dished plate, possibly covered by a skin. Their function is, in particular, to conceal numerous housings and/or conduits, and to bear fittings, accessories, air conditioning systems and/or electrical systems provided in this area.

In such devices, the method of fixing the said housings and/or conduits varies considerably from one type and/or version of a vehicle to another. Some, for instance, are secured to the rear face of the panel, others to the body of the vehicle, for example, to its front body panel.

Presently known dashboards thus necessitate the use of numerous intermediate pieces for support and/or fixing purposes, in particular to ensure transfer of the load in the case of the heaviest fittings and/or accessories, thus requiring a large number of assembly operations and of stock items to be handled.

As an indirect consequence, they make it necessary to restrict diversification of the external finishes to avoid yet further increasing the number of their component parts.

The assembly of presently known dashboards is also made particularly difficult by the fact that it often requires operations to be carried out <<blind>>, these operations further having to be conducted in a confined space such, for example, as that of a vehicle body in the process of being manufactured.

In this connection, it is to be noted that the production of these vehicles is, moreover, slowed down by the assembly of the dashboards and the production rate thus slackens, particularly when the vehicle to be assembled has numerous fitting options.

The object of the present invention is to provide a vehicle dashboard that overcomes the aforementioned drawbacks by permitting the use of parts that are common to different versions of a vehicle.

Another object of the present invention is to provide a vehicle dashboard making it possible to limit the number of parts that vary from one version of a vehicle to another.

A further object of the present invention is to provide a vehicle dashboard that makes it possible to promote diversification of the trim without adverse effects on its cost and/or production deadlines.

Another object of the present invention is to provide a vehicle dashboard that is easier to assemble owing to the elimination of <<blind>> operations.

Another object of the present invention is to provide a vehicle dashboard that can be pre-assembled with all of the accessories and/or fittings that have to be integrated therein, in such a way as to enable it to be installed in the vehicle in one piece.

One advantage of the present invention is that it makes for weight saving and/or a reduction in space taken up.

Further objects and advantages of the present invention will emerge in the course of the description that follows, which is given only by way of illustration and is not intended to limit same.

SUMMARY OF THE INVENTION

The present invention relates to a dashboard for a vehicle, in particular a motor vehicle, the structure of which is capable of permitting at least the integration of different accessories and/or internal fittings of the said vehicle, characterised by the fact that its is composed, at least:

of a base framework, the configuration of which is predetermined for the type of the vehicle, secured to the body of the latter;

an intermediate framework, the configuration of which is semi-permanent as a function of the version of the fittings of the vehicle, secured to the base framework;

a variable trim, capable of covering the base framework and/or the intermediate framework in such a way as to ensure the aesthetic finish of the dashboard.

The invention will be more readily understood from a study of the following description and of the annexed drawings, which form an integral part thereof.

DETAILED DESCRIPTION OF THE INVENTION

The present invention relates to a dashboard for a vehicle such as, in particular, a motor vehicle.

Although more particularly developed for such applications, it can also be used in numerous other vehicles, seagoing craft, aircraft and/or land vehicles.

More generally speaking, it will be possible, moreover, to implement it as an internal arrangement grouping together various accessories and/or fittings, in all fields of industrial activity in which one encounters driving, control, supervisory or other positions or stations, whether it be in fixed or in mobile installations.

A dashboard is to be taken as meaning, broadly speaking, an internal arrangement for a vehicle, provided at the front of its passenger compartment, having a structure suitable for permitting at least the integration of different accessories and/or internal fittings of the vehicle in order, in particular, to facilitate the driving thereof, enhance the security of its passengers and improve the comfort of the interior of the passenger compartment and/or other aspects.

Figure 1:
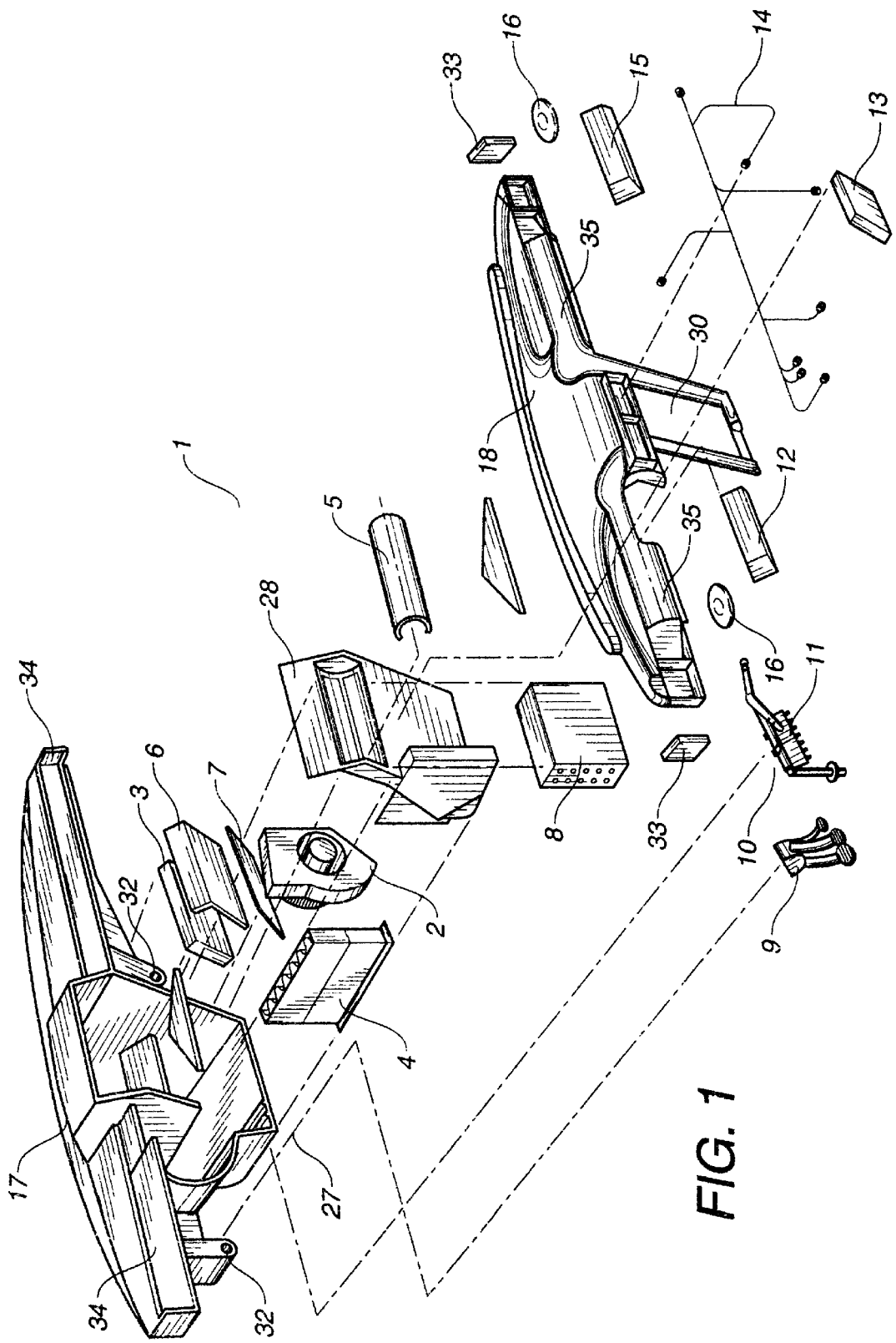
FIG. 1 describes, partially, in an exploded view, an example of a dashboard according to the invention.

As shown in FIG. 1, the items 1 of accessories and/or internal fittings are composed, for example, of a ventilation, heating and/or air conditioning device, including, in particular, a pulsing device 2, a radiator 3, a pollen filter 4, a distributor 5, a heating flap 6, a recycling flap 7 and, possibly, an evaporator 8.

There may also be, for example, a pedal system 9, a steering column 10, a fuse box 11, an instrument housing 12, a car radio housing 13, electrical wiring 14, an inflatable cushion device 15 and/or loudspeakers 16.

Figure 2:
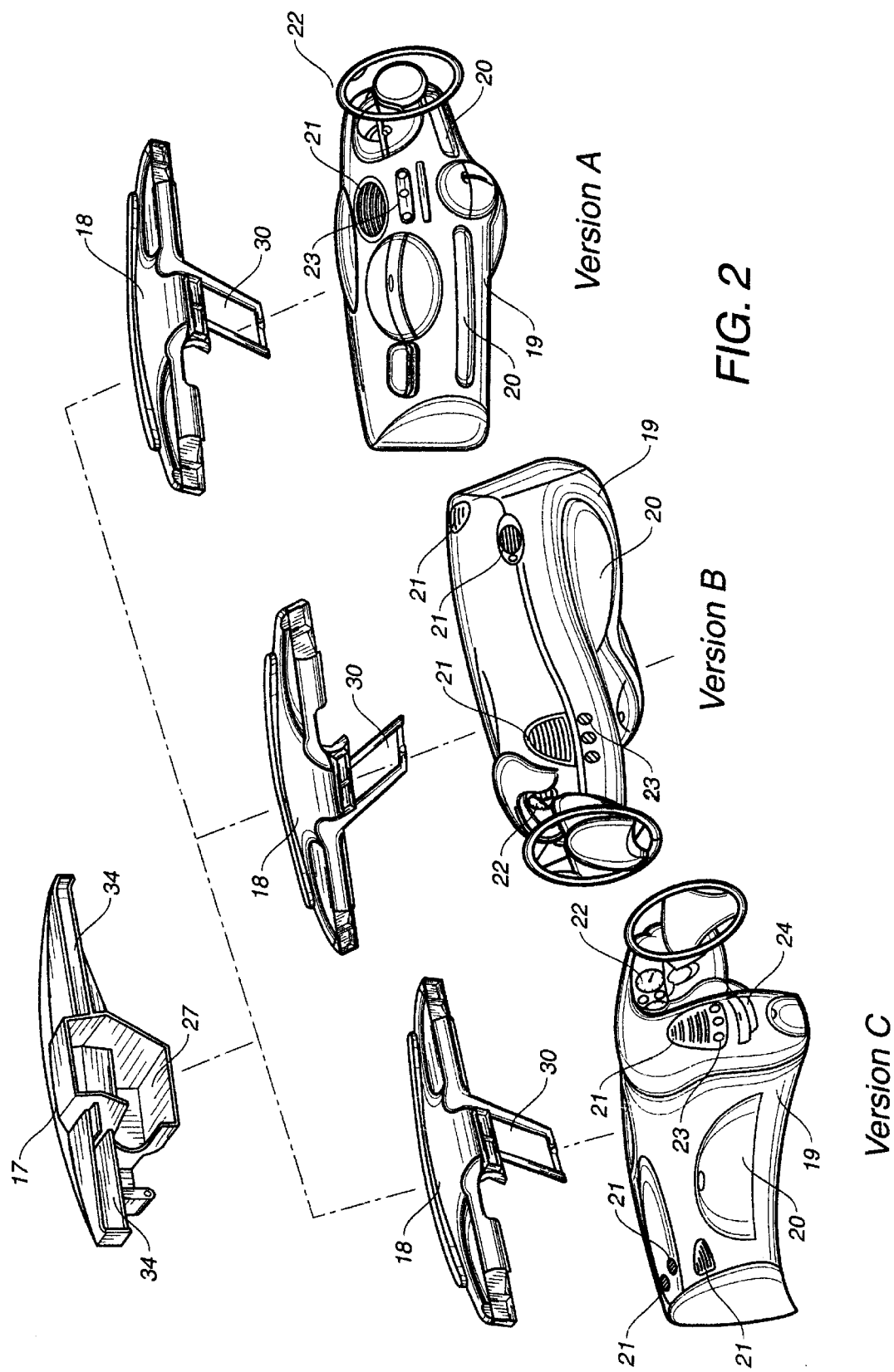
FIG. 2 diagrammatically illustrates the composition of three alternative forms of embodiment of a dashboard according to the invention.

With reference to FIG. 2, it can be seen that the dashboard according to the invention is composed, at least, of a base framework 17, an intermediate framework 18 and a trim 19.

The configuration of the base framework 17 is pre-established for the type of the vehicle. What this means is that the same base framework 17 can be used from one vehicle to another in the case of vehicles of substantially the same size, regardless, of any criterion relating, for example, to the construction, the version of the fittings, the location of the driving position, etc.

According to the invention, the base framework 17 is secured to the body of the vehicle, for example, in the region of its front body panel.

The configuration of the said intermediate framework 18 is semi-permanent as a function of the version of the fittings of the vehicle. The configuration will thus be variable, for example locally, and will depend, in particular, on the presence of the structure and/or the location of the different items 1 of accessories and/or internal fittings 1 as a function, among others, of the different criteria set out above.

According to the invention, the intermediate framework 18 is secured to the base framework 17, the latter two serving, in particular, to support the items 1 of accessories and/or fittings.

As to the trim 19, this is designed to be variable and capable of covering the said base framework 17 and/or the intermediate framework 18 in such a way as to ensure the aesthetic finish of the dashboard.

Thus, preferably, a maximum of items 1 of accessories and/or fittings are provided in the area of the base framework 17 and/or of the intermediate framework 18, while their number is restricted with regard to the trim 19.

The latter can, nonetheless, serve to support items 1 of accessories and/or fittings having faces visible to the occupants such as, for example, a glove compartment 20, air diffuser grilles 21 and/or loudspeakers, the front 22 of the instrument housing 12, control panel 23 for the ventilation, heating and/or air conditioning and/or the control panel 24 of car radio 13.

As more especially illustrated, the invention thus enables the same basic structure 17 to be used for a large number of dashboards, such as those termed <<version A>>, <<version B>> and <<version C>>, while the versions have, in particular, a different trim 19 and/or driving position location. As to the intermediate framework 18, this is, for example, adapted locally as a function of the different versions represented and forms, in particular, an interface between the base framework 17 and the trim 19.

By way of example, the framework 18 provides for the integration, or otherwise, of the evaporator 8, depending upon whether the vehicle is equipped or not with air conditioning; similarly, the pedal system 9 and the steering column 11, on one hand, and the inflatable bag 15, on the other hand, are installed respectively to the left and to the right of one version of framework 18, and switched over in the case of another version, depending on whether the vehicle is of the left or right-hand drive type.

Referring once again to FIG. 1, it will be noted that, according to a particular form of embodiment of the invention, base framework 17 is capable of supporting and/or constituting a load transfer surface for, in particular, at least the accessories and/or fittings 1 designed to be similar for the same type of vehicle.

The expression 'accessories and/or fittings 1 that are similar for the same type of vehicle' is intended to mean items 1 that are to be found, generally speaking, in vehicles of the same type, this being with a substantially similar layout and/or structure, particularly as regards their overall dimensions and the way they are mounted.

According to the example illustrated, the items 1 that are similar for the same type of vehicle are formed by parts of the ventilation, heating and/or air conditioning device.

Base framework 17 is also capable of bearing, for example, pedal system 9, steering column 10 and/or the inflatable cushion device 15.

According to the same embodiment example, intermediate framework 18 is capable of bearing, and/or co-operating with, all or part of the items 1 of accessories and/or internal fittings, designed to be different from one vehicle version to another, that is to say items 1 the presence, structure and/or layout of which, in particular, vary from one vehicle version to another.

The items 1, designed to be different, borne by, and/or cooperating with, the intermediate framework 18, are formed, or example, by instrument housings 12 and car radio housings 13, the electrical wiring 14 and/or the loudspeakers 16.

This distribution of items 1 between the different frameworks 17, 18 is, of course, only described by way of illustration and is in no way limitative.

Thus, for example, the electrical wiring 14 can also be supported, in particular, by base framework 17, the part common to all the vehicles forming part of the base framework 17, while the other part forms part of intermediate framework 18.

In this connection, the items are grouped together, for example, according to a permanent, semi-permanent and variable principle of organization. The said permanent items 1, that is to say those that are similar for the same type of vehicle, are thus grouped together with base framework 17, the semi-permanent items 1, that is to say those that differ from one vehicle version to another, are grouped together with the intermediate framework 18, the trim 19 grouping together the items 1 of external finish.

As mentioned above, the permanent items 1 are formed, for example, by the parts of the ventilation and heating device. Semi-permanent items 1 are formed, for example, by evaporator 8, pedal system 9, steering column 10, the instrument and car radio housings 12, 13, by electrical wiring 14, inflatable cushion device 15 and/or loudspeakers 16.

It will be noted that the said semi-permanent items 9–15 are designed to be placed in different positions, depending on whether a left or right-hand drive vehicle is involved, while evaporator 8 and/or loudspeakers 16 can be optional.

Figure 3A:
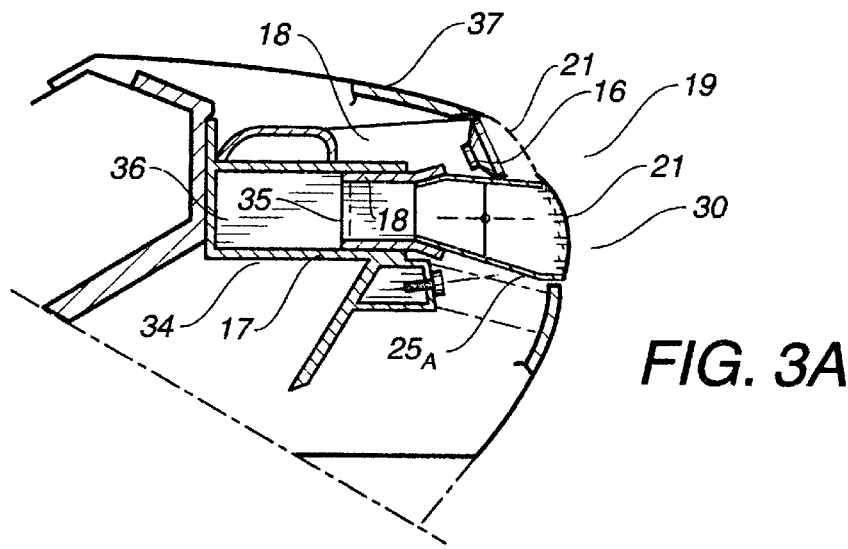
FIGS. 3A, 3B and 3C show details, respectively, of a part of the three alternative forms of embodiment illustrated in FIG. 2, in cross-section in the region of one of their lateral ends.
Figure 3B:
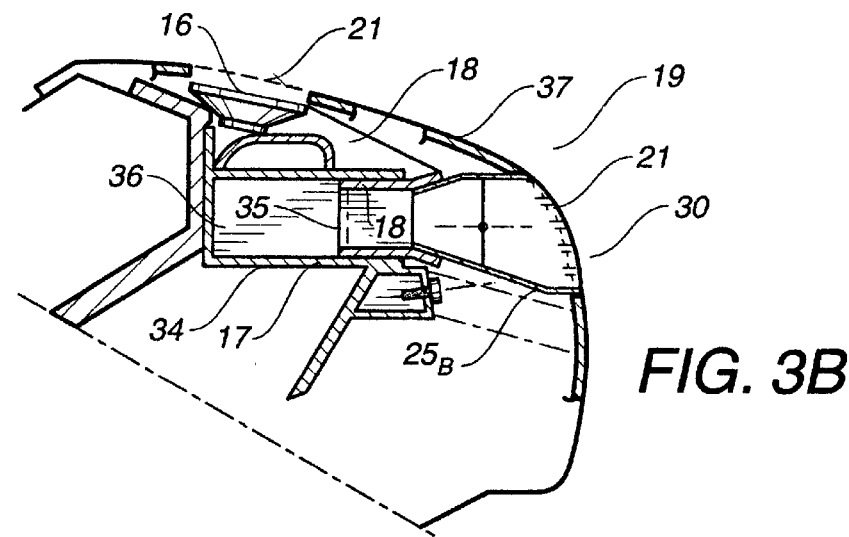
Figure 3C:
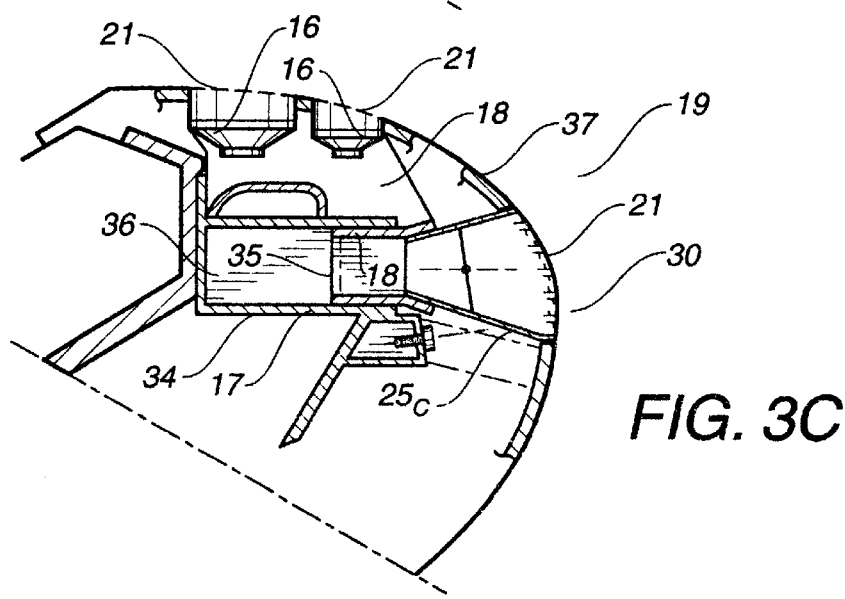

FIGS. 3A to 3C show the respective configurations of base framework 17, intermediate framework 18 and trim 19 in the region of one of the lateral ends of each of the three dashboard versions, A, B, C according to the invention shown in FIG. 2.

As mentioned earlier, base framework 17 is common to each of the three versions.

As to intermediate framework 18, its configuration is adapted according to the number and/or the location of loudspeakers 16. On the other hand, according to the example shown, it is to be noted that it retains an identical profile for supporting the different lateral air diffusers $25_A$, $25_B$, $25_C$.

As to trim 19, which is partially shown, it will be observed that it is entirely modified for each of the versions.

Figure 4A:
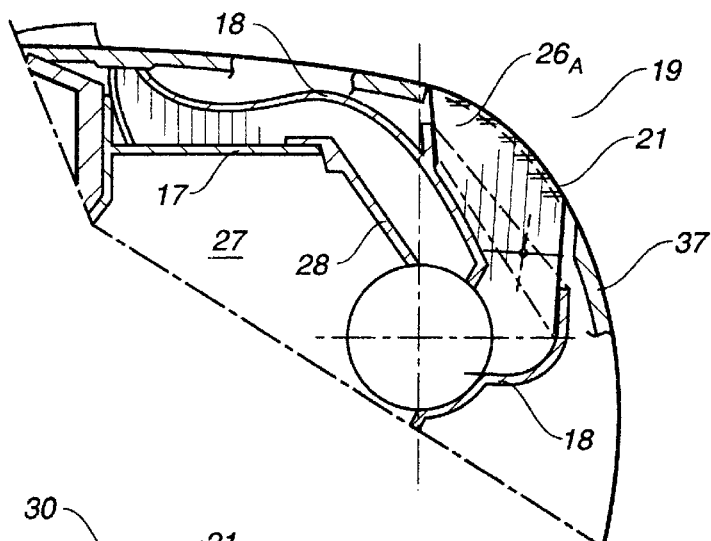
FIGS. 4A, 4B and 4C show details, respectively, of another part of the three alternative forms of embodiment of FIG. 2, in cross-section in the region of one of their median areas.
Figure 4B:
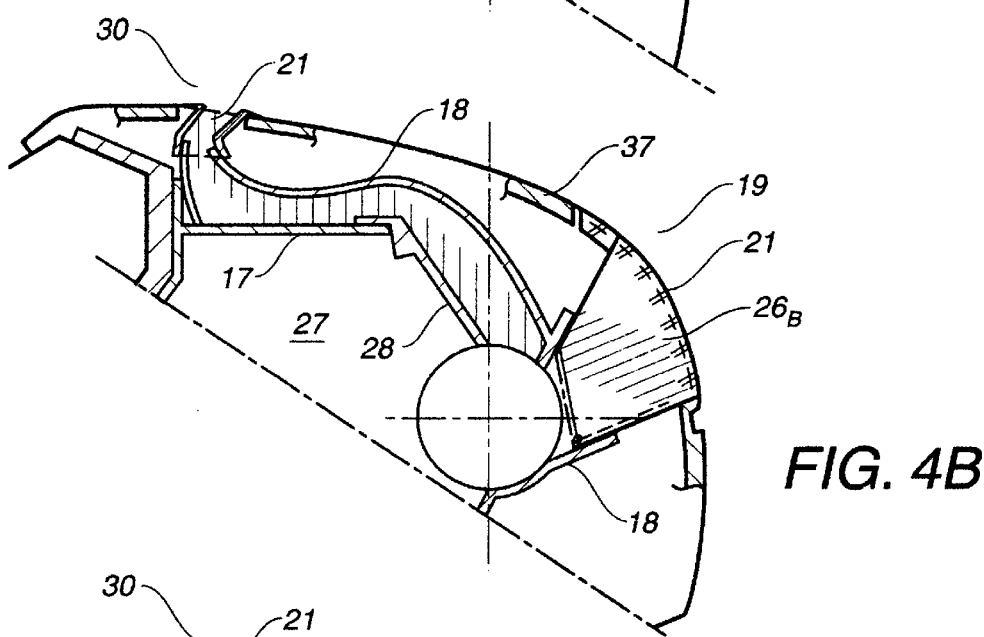
Figure 4C:
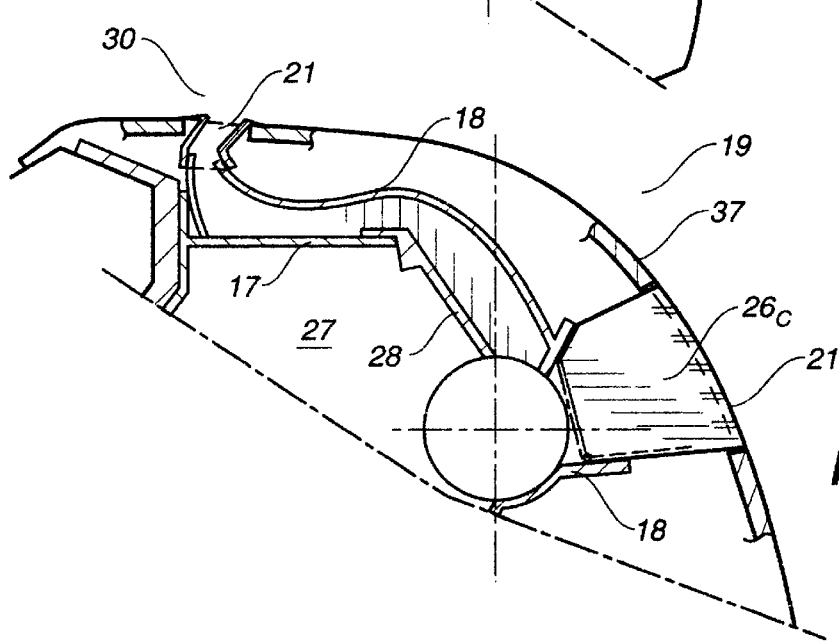

Similarly, in FIGS. 4A to 4C, base framework 17 has a configuration that is identical for each of the versions, whereas intermediate framework 18 is locally adapted so as to support different central air diffusers $26_A$, $26_B$, $26_C$.

As to trim 19, this also has in this area, as in the rest of the dashboard, a profile that is modified considerably from one version to another.

According to one particular form of embodiment of the invention, base framework 17 is further capable of forming a lateral reinforcement for the vehicle. Indeed, its dimensions can correspond, for example, to the width of the vehicle. The base framework 17 then extends from one wing to the other and thus reinforces resistance, in particular to lateral impact.

According to this form of embodiment, the base framework 17 can be secured to the body of the said vehicle also, for example, in the area of the wings, in particular in the vicinity of the front doors.

The base framework 17 is made, for example, of reinforced thermoplastic material, in particular, using a metallic material or reinforcing fibres.

Referring once more to FIG. 1, it will be noted that the dashboard according to the invention is provided, for example, with self-supporting means capable of permitting pre-assembly of the items 1 of accessories and/or fittings as a whole on the dashboard prior to its being fixed in the vehicle.

Thus, according to this exemplary embodiment of the invention, the dashboard can be installed, at the time of manufacture of the vehicles in which it is to be mounted, in a single, interchangeable block.

The self-supporting means include at least locations 27, which can be seen in FIGS. 1 and 4A to C, provided on the base framework 17 and/or the intermediate framework 18, capable of permitting the successive fitting onto the base framework 17 of a first part of the items 1 and of the intermediate framework 18, and then, onto the intermediate framework 18, of a second part of the said items 1 before being covered by the trim 19.

Thus, as indicated in dotted lines, on the base framework 17 are mounted, first of all, in particular, pulsing device 2, radiator 3, pollen filter 4, heating flap 6, recycling valve 7, and a central closing component 28, capable of guiding the flow of air, and, on the central closing component 28, distributor 5.

It is also possible to mount, on the base framework 17, the semi-permanent items, in particular, pedal system 9 and/or steering column 10, on the right or on the left, depending on whether it is a right or left-hand drive vehicle.

Intermediate framework 18 is then mounted; on this are then secured, among others, instrument housing 12 and/or car radio housing 13, electrical wiring 14 and/or loudspeakers 16.

The self-supporting means further have, in particular, orifices and/or cut-out portions 30 capable of permitting passage from base framework 17 to the front body panel of the vehicle, from intermediate framework 18 to base framework 17 and/or, as shown in FIGS. 3 and 4, from trim 19 to intermediate framework 18; inflatable cushion device 15 is thus secured to base framework 17 via an orifice provided in intermediate framework 18, according to a form of embodiment of the invention not shown.

In order to enable the dashboard to be fixed in one piece in the vehicle, as mentioned above, the self-supporting means also include, for example, openings 32, provided in particular, on base framework 17. In addition, shims 33 enable base framework 17 to be fitted, if necessary, into the body of the vehicle to contribute to giving the base framework its role of bracing member to withstand lateral impact.

According to one particular form of embodiment of the invention, locations 27 are open on their front faces in such a way as to provide a direction of mounting for items 1 making for easier successive inter-fitting, in particular, avoiding the need for <<blind>> operations.

As to trim 19, this is secured, for example, to base framework 17 and/or to intermediate framework 18.

Referring now to FIGS. 3A to 3C and 4A to 4C, it will be noted that the dashboard according to the invention includes, if necessary, means for guiding the circulation of an air flow, provided, on one hand, on the base framework 17 and, on the other hand, on the said intermediate framework 18. They are formed, for example, by channels 34, provided on the base framework 17, and by the intermediate framework 18, locally forming, opposite, a cover 35 for the channels 34 so as to form conduits 36 for air circulation, for example in the direction of the upper end and/or of the lateral ends of the dashboard.

In this connection, the cover 35 includes, if necessary, flow orientation vanes, arranged according to the versions of the fittings of the vehicle.

Moreover, trim 19 is composed, for example, of one or more of material 37 having at least one face of aesthetic appearance.

This can be, for example, injected polypropylene provided with a textile over-moulded portion, with paint based decoration and/or graining. The trim 19 can also have parts of formed metal.

The aesthetic aspect of the trim 19 can also be enhanced by the curvature of the panels 37.

Other implementations of the present invention, within the grasp of a man of the art, could, of course, have been contemplated without thereby departing from the scope of the present application.

We claim:

1. An apparatus comprising:
   a motor vehicle;
   a plurality of components of said motor vehicle;
   a dashboard secured to said motor vehicle and receiving said plurality of components therein, said dashboard comprising:
   a base framework secured to said motor vehicle so as to form a lateral reinforcement for said motor vehicle, said base framework forming a load transfer surface for said plurality of components;

an intermediate framework removably secured to said base framework, said intermediate framework bearing said plurality of components therein;

a trim covering said base framework and said intermediate framework, said trim having an aesthetically desired exterior surface;

a self-supporting means affixed to said base framework and said intermediate framework, said self-supporting means for preassembling said plurality of components on said dashboard prior to securing said dashboard to said motor vehicle, said base framework and said intermediate framework having openings formed respectively therein, said openings of said base framework receiving a first part of said plurality of components and receiving said intermediate framework therein, said intermediate framework receiving a second part of said plurality of components therein, said plurality of components being covered by said trim, at least some of said openings of said base framework affixed to said motor vehicle so as to attach said dashboard to said motor vehicle as a single assembly.

2. The apparatus of claim 1, said dashboard having air circulation flowable therethrough, the apparatus further comprising:

a means for guiding the air circulation, said means being affixed to said base framework and said intermediate framework.

3. The apparatus of claim 2, said means for guiding air circulation comprising:

a plurality of channels formed in said base framework, said intermediate framework forming a cover for said plurality of channels so as to define an air circulation conduit in said intermediate framework.

4. The apparatus of claim 3, said cover having flow orienting vanes formed therein.

5. The apparatus of claim 1, said trim having at least one panel having said aesthetically desired exterior surface.

\* \* \* \* \*